United States Patent [19]

Kearney

[11] 4,174,836

[45] Nov. 20, 1979

[54] GAME FOR SIMULATING SUBMARINE CONNING STATION

[75] Inventor: Phillip C. Kearney, Aptos, Calif.

[73] Assignee: Atari, Inc., Sunnyvale, Calif.

[21] Appl. No.: 852,434

[22] Filed: Nov. 17, 1977

[51] Int. Cl.² .............................................. A63F 9/02
[52] U.S. Cl. .................................. 273/101.2; 35/25; 273/DIG. 28
[58] Field of Search ................... 35/10 Z, 11 A, 12 N, 35/19 R, 25; 272/8 R, 8 D, 8 C, 16; 273/1 E, 85 G, DIG. 28, 101.2; 358/104

[56] References Cited

U.S. PATENT DOCUMENTS

| | | | |
|---|---|---|---|
| 2,300,132 | 10/1942 | New | 273/101.2 |
| 2,497,003 | 2/1950 | Larson | 273/101.2 |
| 2,531,608 | 11/1950 | Bula | 273/101.2 |
| 3,504,122 | 3/1970 | Ratliff | 35/25 |
| 3,542,934 | 11/1970 | Warhurst et al. | 35/11 A X |
| 3,613,264 | 10/1971 | Vitka et al. | 35/19 R |
| 3,624,925 | 12/1971 | Herndon | 35/25 |
| 3,691,284 | 9/1972 | Borjeson | 35/25 X |
| 3,698,102 | 10/1972 | Driskell | 35/25 |
| 3,831,172 | 8/1974 | Olliges et al. | 273/1 E X |
| 3,900,703 | 8/1975 | Tickle | 35/11 A X |

Primary Examiner—Vance Y. Hum
Attorney, Agent, or Firm—Townsend and Townsend

[57] ABSTRACT

An amusement game which includes a rotating column and viewport for simulating the periscope column at the conning station of a submarine. A video tube is mounted within the column and is operated to form a video display simulating periscope scenes projected along the line of sight of the viewport. An enclosure with transparent walls which confine a liquid is carried within the column and is disposed across the line of sight for creating a simulated water line which is superimposed together with a graticule on the video display. A speaker is carried on the column for simulating the audio environment at the conning station. A deck and railing are mounted about the column, and the railing supports a simulated overhead above the column. A cupola having a peripheral panel of transparent material is mounted on the overhead, and a backlighted drum displaying a panoramic scene is mounted within the cupola for rotation with the column.

11 Claims, 10 Drawing Figures

GAME FOR SIMULATING SUBMARINE CONNING STATION

BACKGROUND OF THE INVENTION

This invention relates to general to amusement games, and in particular relates to video games.

Heretofore various types of video games have been provided for amusement purposes. Typically the games are operated by one or more players sitting or standing at a control console so that they can view the video display on a screen mounted in front of them. In games of this type the display on the screen can be viewed by non-players and bystanders in the area. As the game is operated the players are thus not completely isolated from the visual, audio and physical environment of the room or other area in which the game is set up.

Amusement games have also been provided which have attempted to simulate certain conditions in a submarine. One such amusement game provides only a relatively small cylinder in front of a video screen within a cabinet for simulating a submarine periscope. An individual playing a game of this type would not find himself in a total environment which evokes the visual, audio and physical conditions at the conning station of a submarine.

OBJECTS AND SUMMARY OF THE INVENTION

It is a general object of the invention to provide a new and improved video amusement game for simulating conditions at a submarine conning station.

Another object is to provide a "first-person" video amusement game in which an individual player is substantially isolated from the environment in the room or other area in which the game is situated, and in which the individual is placed in an environment which simulates the visual, audio and physical conditions at a submarine conning station.

Another object is to provide a game of the type described in which the player looks through the viewport of a simulated periscope column, and in which means is provided for creating superimposed images in the port of a periscope graticule, a simulated view of a water line, and a simulated surface view as seen through a periscope.

Another object is to provide a game of the type described in which the superimposed image of the simulated water line undergoes wave-action movement responsive to rotation of the periscope column.

Another object is to provide a game of the type described which includes a cupola above the periscope column for creating a panoramic scene to observers, and in which the scene changes as the column is rotated.

The invention in summary includes an upstanding column which simulates a submarine periscope and which is mounted for rotation about a vertical axis. A periscope viewport is formed in the column. Means are provided for forming an image in the viewport which simulates a view as seen through the periscope of a submarine.

The foregoing and additional objects and features of the invention will appear from the following specification in which the several embodiments have been set forth in detail in conjunction with the accompanying drawings.

DESCRIPTION OF THE PREFERRED EMBODIMENTS

Figure 1:
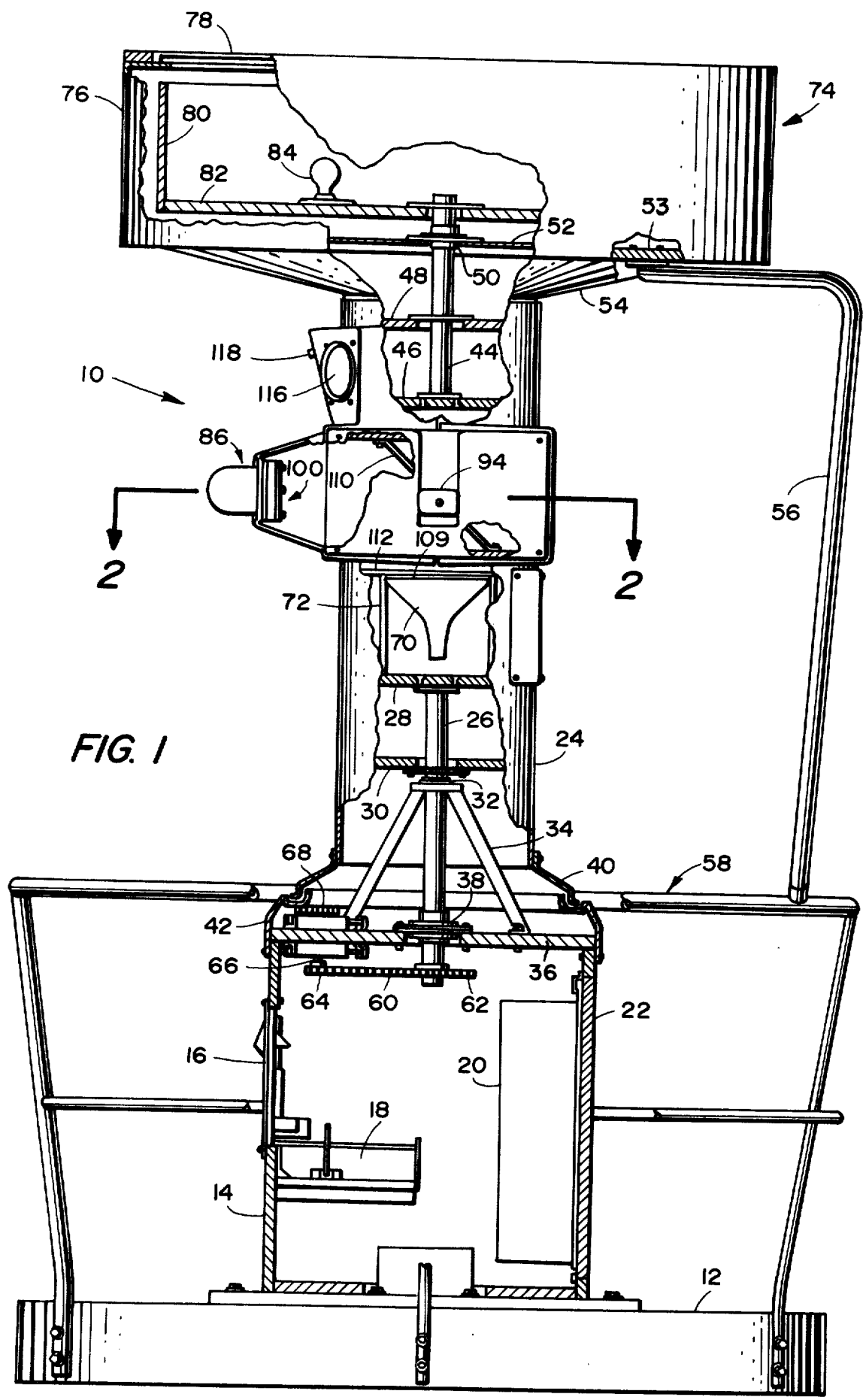
FIG. 1 is a side elevational view, partially broken away, of a video amusement game according to the invention.
Figure 3:
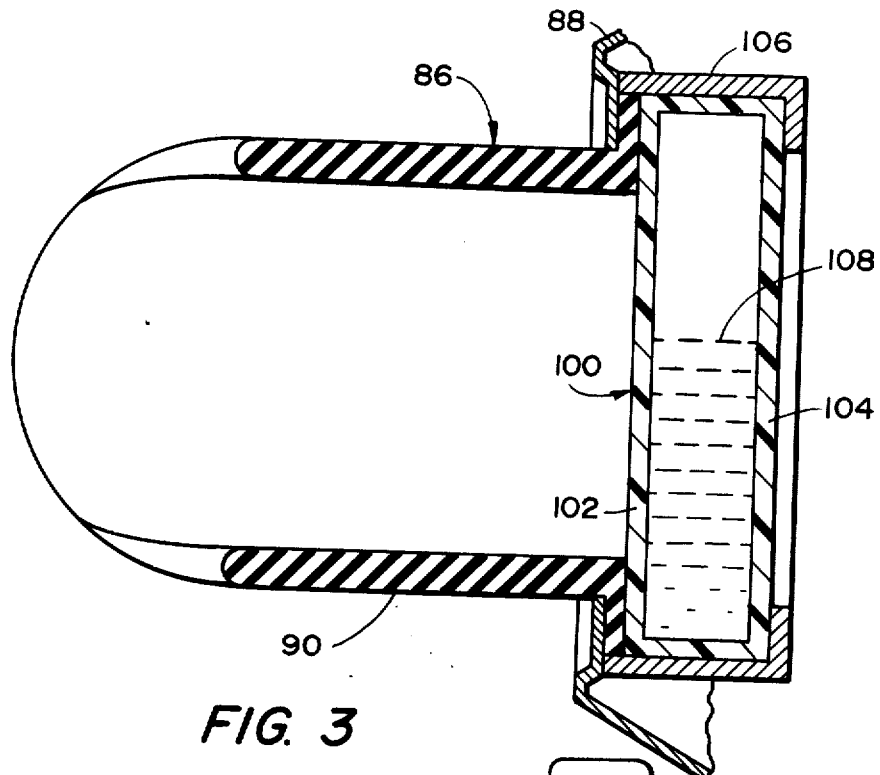
FIG. 3 is a vertical section view taken along the line 3—3 of FIG. 2.
Figure 2:
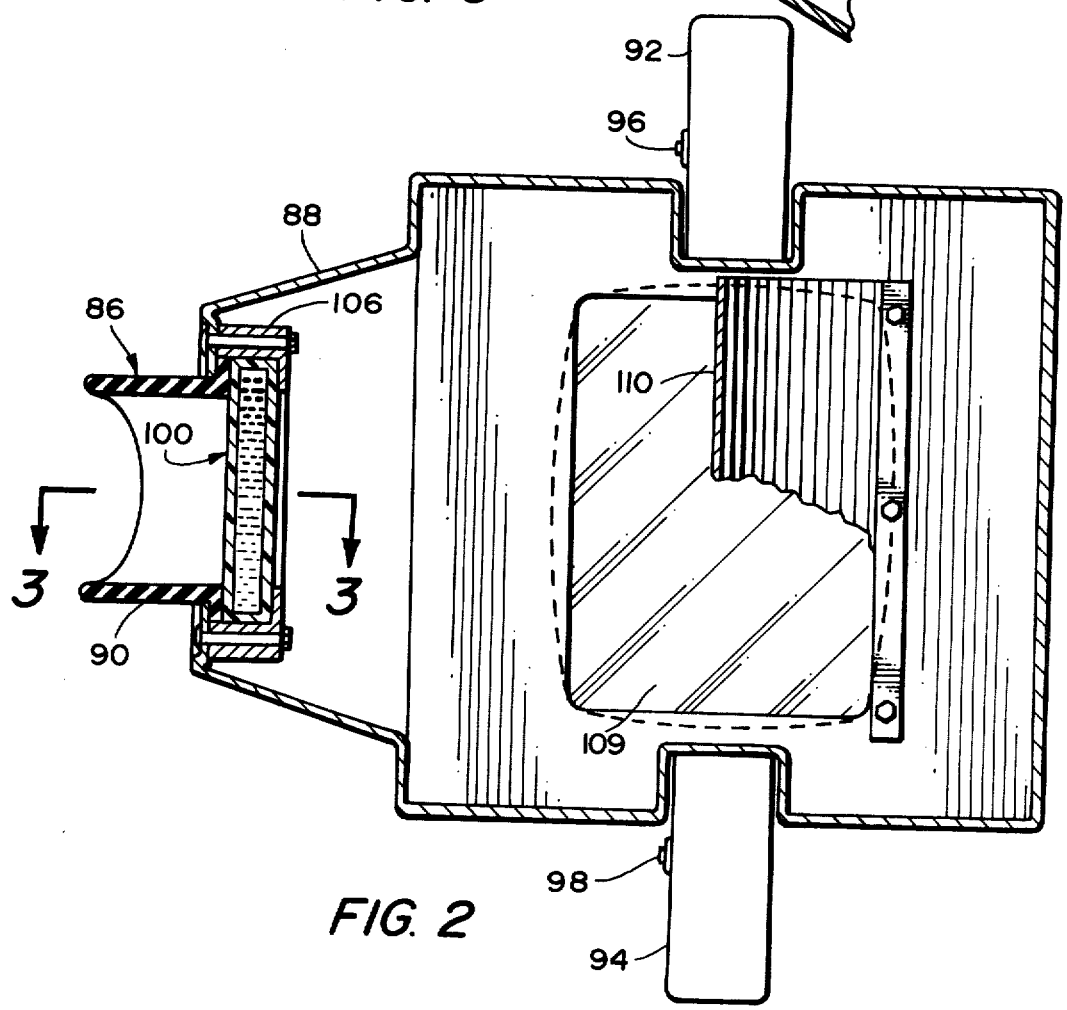
FIG. 2 is a cross-sectional view taken along the line 2—2 of FIG. 1.

In the drawings, FIG. 1 illustrates generally at 10 an amusement game incorporating the invention and which simulates conditions at the conning station of a typical submarine. The game includes a circular base or platform 12 which forms a deck above which a cylindrical pedestal 14 is mounted. A lockable coin slot panel 16 is mounted on the side of the pedestal for feeding coins into a coin box 18. An electronics module 20 carrying a suitable power supply, printed circuit board and other components of a game control circuit is mounted on the inside of a hatch 22 provided on a side of the pedestal.

A vertically elongate hollow cylinder or column 24 which simulates a periscope column is mounted above the pedestal for rotation about a vertical axis. The periscope column is mounted by means which includes a post 26 coaxially attached on circular bulkheads 28 and 30 affixed within the column. An intermediate portion of the post extends through a bearing 32 carried by the upper end of a frame 34 which in turn is carried on a bulkhead 36 mounted across the upper end of the pedestal. The lower end of the post projects through a bearing 38 mounted in a center opening formed in bulkhead 36. An annular skirt 40 mounted about the lower end of column 24 rotates in close-shaped relationship with an annular shield 42 mounted above the pedestal for preventing unintended entry beneath the column. The upper end of the column is rotatably supported by a post 44 which is attached to circular bulkheads 46 and 48 affixed within the column. The upper end of the post projects through a bearing 50 carried in the center opening of a panel 52 which in turn is mounted above a cupola base 53 and frusto-conical panel 54 which simulates the overhead of the conning tower. The base 53 is carried at one side by a support frame 56 which extends upwardly from tubular railing 58. The railing is mounted about the greater part of the perimeter of deck 12 to provide a walkway which isolates the player from surrounding spectators so that the player can walk with the column as it is turned.

Motion sensing means is provided for sensing the relative position of the column with respect to the pedestal and provide a position input signal to the electronics control circuit for purposes to be explained below. The motion sensing means includes an endless chain 60 trained about a sprocket 62 carried at the lower end of post 22 and also trained about a sprocket 64 carried on a shaft 66 mounted for rotation on bulkhead 36. The position of a wheel 68 carried at the upper end of shaft 66 is electronically sensed by a suitable position sensing pick-up, not shown, which generates the position input signal for the control circuit. The drive train for the motion sensing means also provides a degree of rotational damping to column 24 for simulating the feel of a periscope. Preferably the column is mounted for rotation through an arc of less than 360°, such as 300°, so that a flexible electronics cable, not shown, can be connected with module 20 and led through the center of post 26 for connection with a video tube 70 which is mounted on brackets 72 above bulkhead 28.

A cupola 74 comprising a cylindrical shell 76 formed of a suitable transparent material, such as clear plastic, is mounted on base 53 above the overhead. The top of the cupola is closed by a cover 78. Within the cupola a backlighted panel 80 shaped as a drum is mounted on a circular disc 82 which is carried on the upper end of post 44 for rotation with the periscope column. The drum is formed of a suitable transparent or translucent material, such as plastic, and it is backlighted by a light source such as the incandescent bulb 84 connected with a power cord, not shown, leading through the center of post 44 down through the periscope column. Graphics is applied to the outer surface of panel 80 to form a suitable panoramic scene which is illuminated by bulb 84 and is observed from outside the cupola. The panoramic scene rotates within the cupola as the periscope column is turned so that the scene changes to observers standing around the game.

A viewport 86 is mounted on a housing 88 at one side of the periscope column. Viewport 80 includes an eyepiece 90 formed of a suitable elastomeric material such as rubber and which is molded to conform to the face of a player so that he is visually isolated from the surrounding room or area in which the game is set up. A pair of handles 92, 94 extend outwardly from opposite sides of the housing for use in rotating the column. Control buttons 96, 98 are mounted on the handles and are connected with the control circuit for simulating the firing of torpedos in a manner described hereafter.

Figure 5:
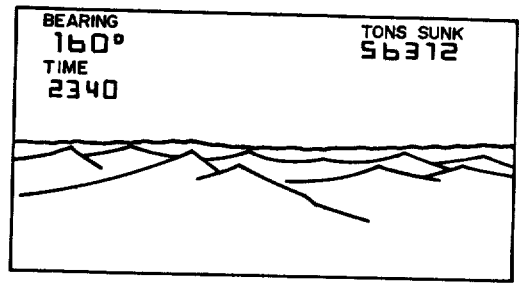
FIG. 5 is the simulated water line image superimposed on the line of sight through the viewport.

A liquid-containing enclosure 100 is mounted in housing 88 across the eyepiece for forming a simulated image of a water line as seen through a submarine periscope. The enclosure includes a pair of flat walls 102, 104 formed of a suitable transparent material such as clear plastic and which are mounted in spaced-apart relationship across the line of sight of the viewport by brackets 106 which are bolted within the housing. The enclosure is filled to substantially the horizontal midline of the walls with a suitable viscous liquid 108 such as a silicone liquid having a viscosity on the order of 5-10 centistokes (cs). The liquid can be colored with a dye for simulating the color of sea water. Simulated wave motion as depicted in FIG. 5 is created on the surface of the liquid within the enclosure as the periscope column is rotated by the player.

Figure 4:
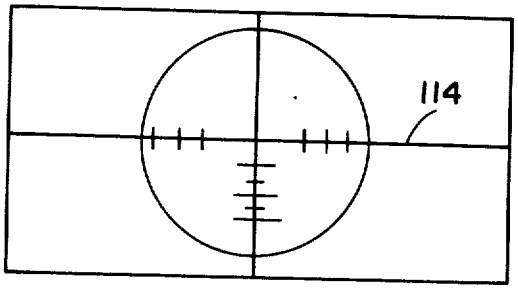
FIG. 4 is the graticule image which is superimposed on the line of sight through the viewport of the game.

Video tube 70 is mounted within the periscope column with the screen 109 facing upwardly. A mirror 110 is mounted at a 45° angle within housing 88 above the tube so that the video display is reflected along the line of sight of the viewport superimposed with the water line image. Immediately above video tube 70 and below the mirror a horizontal transparent plate 112 is mounted. The plate is formed with a periscope-type graticule 114 having crosshairs and stadia marks, the outline of which is reflected by mirror 110 along the line of sight of the viewport to create the image illustrated in FIG. 4.

Figure 6:
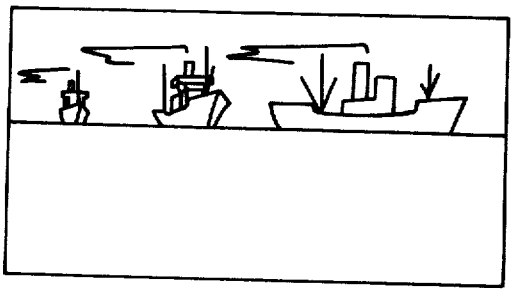
FIG. 6 is a typical video image of a surface scene superimposed on the line of sight.
Figure 7:
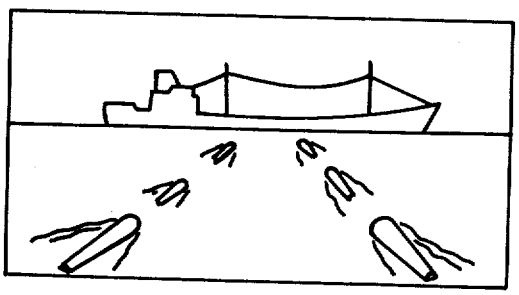
FIG. 7 is another typical video image of a scene similar to FIG. 6.
Figure 10:
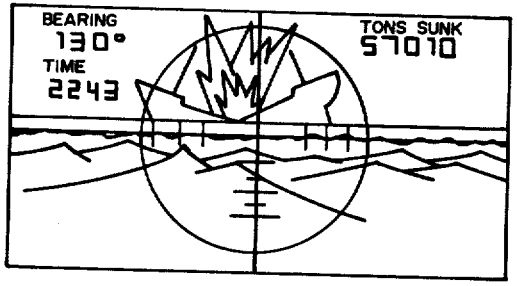
FIG. 10 is a typical scene through the viewport showing the superimposed images of the graticule of FIG. 4, the simulated water level of FIG. 5, and a typical video image similar to FIG. 6.
Figure 8:
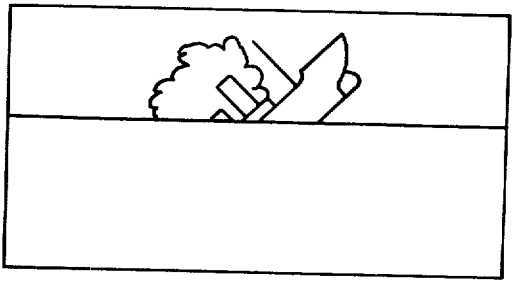
FIG. 8 is a further typical video image of a scene similar to FIG. 6.
Figure 9:
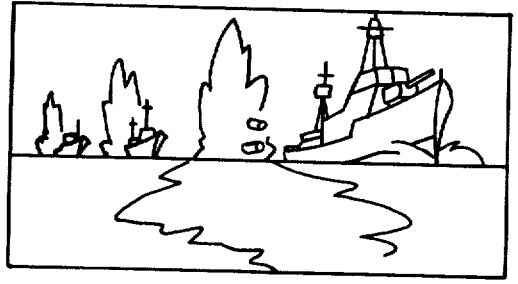
FIG. 9 is a still further typical video image of a scene similar to FIG. 6.

The control circuit within module 20 operates tube 70 to form a progression of animated video displays which are generated by suitable integrated circuit semiconductor chips. The video displays simulate a typical surface view as seen through the periscope of a submarine, such as when attacking a target. For example, the video display illustrated in FIG. 6 would represent merchant ships which are presented as targets to the player. The display of FIG. 7 represents a merchant ship toward which are emerging torpedoes fired by the attacking submarine. The display of FIG. 8 represents a ship which is sinking after a hit from a torpedo. FIG. 9 represents destroyers or escort vessels which are attacking the submarine. FIG. 10 illustrates the manner in which the optical system of the invention represents to the view of the player superimposed images of the graticule of FIG. 4, the water line of FIG. 5 and a video image of a ship immediately after being struck by a torpedo.

The control system also generates digital information on the video screen, which information is continually updated so that the player can monitor progress of the game. FIGS. 5 and 10 illustrate typical digital information which includes the azimuth in degrees of the periscope bearing, the "tons sunk" or cumulative score, and the military time.

Speakers 116 are mounted on the column above the viewport housing and are connected with the control circuit to generate a program of sounds which simulate the audio environment in a conning tower during a torpedo attack. The control circuit can be programmed to provide a variety of simulated sounds including, for example, the sonar ping from surface vessels, the intercom talk such as torpedo firing commands, the firing and explosion of torpedoes, a klaxon horn or dive warning, the steam siren of an attacking destroyer, and the sound of depth charges. The different sounds are programmed to coordinate with the appropriate video displays as the game progresses.

The use and operation of the invention is as follows. The game is initiated by inserting a coin in the slot of panel 16 and pressing the start or "up periscope" button 118. The control circuit is activated to generate a video display on the screen of tube 70, such as the merchant ships illustrated in FIG. 6. The speakers are also activated to provide the simulated sound of intermittent sonar pings. While looking through viewport 86 the player rotates periscope column 24 by the handles until the cross hairs of graticule 114 are on a target of opportunity. The fire buttons on either handle are depressed and the control system generates the display of torpedos shown in FIG. 7. The player can then rotate the column to another target in an attempt to sink it. As the column is rotated the chain 60 drives motion sensing wheel 68 for generating a position input signal which is monitored by the control circuit to operate the video display and depict the periscope view as if undergoing a change in azimuth, i.e. the display sweeps across the simulated surface scene. The display of a hit on a target is shown in FIG. 10, while the sinking of a ship is shown in FIG.

8. While the column is rotated the inertia of the liquid causes the liquid level in enclosure 100 to undergo relative motion and simulate surface waves. After a predetermined period of time the control system generates the display of attacking escort destroyers shown in FIG. 9. The player must find and sink the attacking destroyer in a certain period, otherwise the simulated depth charge attack from the destroyers will terminate the game.

While the foregoing embodiments are at present considered to be preferred it is understood that numerous variations and modifications may be made therein by those skilled in the art and it is intended to cover in the appended claims all such variations and modification as fall within the true spirit and scope of the invention.

What is claimed is:

1. A game for simulating the visual, audio and physical conditions at the conning station of a submarine, including the combination of a pedestal, a simulated periscope column mounted on the pedestal for rotation about a vertical axis, a periscope eyepiece carried on a side of the column for viewing along a line of sight, video means mounted within the column for forming a video display which simulates a scene viewed through the periscope of a submarine, means for directing the video display along the line of sight of the eyepiece, enclosure means having spaced-apart transparent walls extending across said line of sight and disposed between the eyepiece and video means, a liquid carried within the enclosure means at a level for creating an image which simulates the water line above a submarine, and speaker means for simulating sounds at the conning station of a submarine.

2. A game as in claim 1 in which the video means includes a video tube mounted within the column and having a video screen facing along a vertical axis, said means for directing the video display includes a mirror facing the video screen and extending at an angle across said line of sight for reflecting the display on the screen toward the eyepiece.

3. A game as in claim 1 which includes means forming a graticule image superimposed on the video display and water line image.

4. A video game which simulates the environment at a conning station of a submarine, including the combination of an upright column simulating the periscope column, means for mounting the column for rotation about a vertical axis, means forming a viewport in the column, video means mounted within the column for forming a first video display simulating a surface view as seen through the periscope of a submarine, said video means being positioned so that the first display is viewed in the viewport, a cupola mounted above the column, said cupola including an outer peripheral panel having a transparent portion, a drum mounted within the cupola for rotation with the column, said drum having an outer surface displaying a panoramic scene for viewing from outside the cupola outer panel, whereby rotation of the column causes rotation of the drum and panoramic scene.

5. A video game which simulates the environment at a conning station of a submarine, including the combination of an upright, tubular column simulating the periscope column, means including shaft means in the column for mounting the column for rotation about a vertical axis, means forming a viewport in the column, video means mounted within the column for forming a first video display simulating a surface view as seen through the periscope of a submarine, said video means being positioned so that the first display is viewed in the viewport, means including a liquid carried by and rotatable with the column with the liquid disposed in a line of sight from the viewport for forming a simulated image of a water line as seen through a submarine periscope with the simulated image being viewed through the viewport superimposed with the video display, said liquid being constrained for movement across the line of sight responsive to rotation of the column for simulating wave action as seen through a submarine periscope.

6. A game as in claim 5, which includes enclosure means carried by the column and containing said liquid, said enclosure means including at least two spaced-apart transparent walls extending across the line of sight of the viewport, said liquid having a surface level between the walls for forming a simulated water line which extends across substantially the horizontal midline of the video display when superimposed thereon.

7. A game as set forth in claim 6, in which said liquid has a viscosity in the range of 5 to 10 centistokes.

8. A video game which simulates the environment at a conning station of a submarine, including the combination of an upright, tubular column simulating the periscope column, means including shaft means in the column for mounting the column for rotation about a vertical axis, means forming a viewport in the column, video means mounted within the column for forming a first video display simulating a surface view as seen through the periscope of a submarine, said video means being positioned so that the first display is viewed in the viewport, a pedestal, a deck mounted around the base of the pedestal, a railing mounted in spaced relationship about the pedestal and spaced above the deck to form a walkway, said shaft means including a shaft rotatably coupled with the pedestal for rotatably mounting the column thereon.

9. A game as in claim 8, which includes means forming a simulated submarine overhead extending about the upper end of the column, and a frame carried from the railing and connected to and supporting the overhead.

10. A video game which simulates the environment at a conning station of a submarine having a periscope column, including the combination of an upright, tubular column simulating the periscope column, a pedestal, a shaft having a lower end rotatably mounted on the pedestal and extending upwardly therefrom, the shaft having means extending laterally therefrom for rigidly connecting the shaft to the inner surface of the column for mounting the column for rotation about a vertical axis, means forming a viewport in the column for rotation about a vertical axis, means forming a viewport in the column, video means mounted within the column for forming a first video display simulating a surface view as seen through the periscope of a submarine, said video means being positioned so that the first display is viewed in the viewport, and means carried by and rotatable with the column in alignment with said viewport for forming a simulated image of a water line as seen through a submarine periscope with the simulated image being viewed through the viewport superimposed with the video display.

11. A video game as set forth in claim 10, wherein said column has an upper tubular part and a lower tubular part, said viewport being adjacent to the junction of said upper and lower parts, the shaft being in the lower part, and including a second shaft, said second shaft being in the upper part and rigidly secured thereto, means defining a support near the upper end of the upper part, means near the upper end of the second shaft for rotatably mounting the same on said support, and means rigidly secured to the upper end of the second shaft for forming a simulated submarine overhead extending about the upper end of the column.

* * * * *